US008424006B2

(12) United States Patent
Jacobson et al.

(10) Patent No.: US 8,424,006 B2
(45) Date of Patent: Apr. 16, 2013

(54) TASK ASSIGNMENT ON HETEROGENEOUS THREE-DIMENSIONAL/STACKED MICROARCHITECTURES

(75) Inventors: Hans M. Jacobson, Yorktown Heights, NY (US); Eren Kursun, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/793,231

(22) Filed: Jun. 3, 2010

(65) Prior Publication Data

US 2011/0302582 A1 Dec. 8, 2011

(51) Int. Cl.
*G06F 9/46* (2006.01)
(52) U.S. Cl.
USPC .......................... 718/102; 718/100; 718/104
(58) Field of Classification Search .................. 718/100, 718/102, 104
See application file for complete search history.

(56) References Cited

U.S. PATENT DOCUMENTS

| | | | | |
|---|---|---|---|---|
| 5,502,838 | A * | 3/1996 | Kikinis | 713/501 |
| 6,000,036 | A * | 12/1999 | Durham et al. | 713/320 |
| 2002/0065049 | A1* | 5/2002 | Chauvel et al. | 455/66 |
| 2006/0095913 | A1 | 5/2006 | Bodas et al. | |
| 2007/0021998 | A1* | 1/2007 | Laithwaite et al. | 705/9 |
| 2008/0043807 | A1* | 2/2008 | Yazawa et al. | 374/141 |
| 2009/0064164 | A1 | 3/2009 | Bose et al. | |
| 2009/0100437 | A1 | 4/2009 | Coskun et al. | |

OTHER PUBLICATIONS

Zhou et al. "Thermal Management for 3D Processors via Task Scheduling", 37th International Conference on Parallel Processing, 2008, pp. 115-122.*
Coskum et al. "Dynamic Thermal Management in 3D Multicore Architectures", Design, Automation & Test in Europe Conference & Exhibition, Apr. 20-24, 2009, 1410-1415.*

* cited by examiner

*Primary Examiner* — Emerson Puente
*Assistant Examiner* — Willy W Huaracha
(74) *Attorney, Agent, or Firm* — Cantor Colburn LLP; William J. Stock

(57) ABSTRACT

A method of enhancing performance of a three-dimensional microarchitecture includes determining a computational demand for performing a task, selecting an optimization criteria for the task, identifying at least one computational resource of the microarchitecture configured to meet the computational demand for performing the task, and calculating an evaluation criteria for the at least one computational resource based on the computational demand for performing the task. The evaluation criteria defines an ability of the computational resource to meet the optimization criteria. The method also includes assigning the task to the computational resource based on the evaluation criteria of the computational resource in order to proactively avoid creating a hot spot on the three-dimensional microarchitecture.

17 Claims, 4 Drawing Sheets

TASK ASSIGNMENT ON HETEROGENEOUS THREE-DIMENSIONAL/STACKED MICROARCHITECTURES

BACKGROUND

The present invention relates to three-dimensional stacked microarchitectures and, more particularly, assigning computational tasks on a heterogeneous three-dimensional stacked microarchitecture.

Three-dimensional (3D) stacks are capable of integrating multiple cores and various types of accelerators arranged in a heterogeneous framework. However the increased degree of constraints in 3D creates various challenges when designing and managing 3D stacked architectures. Contrary to 2D architectures, in which optimization targets a single characteristic, 3D stacks are managed with a goal of optimizing multiple characteristics. That is, given the close relationship between performance, power, temperature and reliability characteristics of stacked or 3D architectures it is desirable to avoid optimizing for a single characteristic as in a 2D architecture.

In a 3D stack, run-time management decisions towards improving only a single characteristic are likely to degrade other characteristics. When performing processing tasks, heat is generated within the 3D logic circuit. The heat, if left unchecked, can build and lead to component breakdowns and circuit failures and minimize or even reverse any benefit achieved from performance oriented task assignment decisions. At present there exist thermal management schemes for two-dimensional (2D) circuits. However, 2D thermal management techniques do not address the particular needs of a 3D stacked architecture. As such, during operation, hot spots tend to develop within various layers, and at various points, of the 3D stacks. Overtime, the hot spots will degrade circuit performance and lead to a shorter operational life cycle for the 3D stacked logic circuit.

SUMMARY

According to one embodiment of the present invention, a method of enhancing performance of a three-dimensional microarchitecture includes determining a computational demand for performing a task, selecting an optimization criteria for the task, identifying at least one computational resource of the microarchitecture configured to meet the computational demand for performing the task, and calculating an evaluation criteria for the at least one computational resource based on the computational demand for performing the task. The evaluation criteria defines an ability of the computational resource to meet the optimization criteria. The method also includes assigning the task to the computational resource based on the evaluation criteria of the computational resource in order to proactively avoid creating a hot spot on the three-dimensional microarchitecture.

According to another embodiment of the present invention, a three-dimensional microarchitecture includes a first layer including a first plurality of computational resources, a second layer including a second plurality of computational resources, and a controller operationally linked to each of the first and second pluralities of computational resources. The controller selectively assigns a task to select ones of the first and second pluralities of computational resources based on an optimization criteria for performing the task in order to proactively avoid a demand hot spot condition on either of the first and second layers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
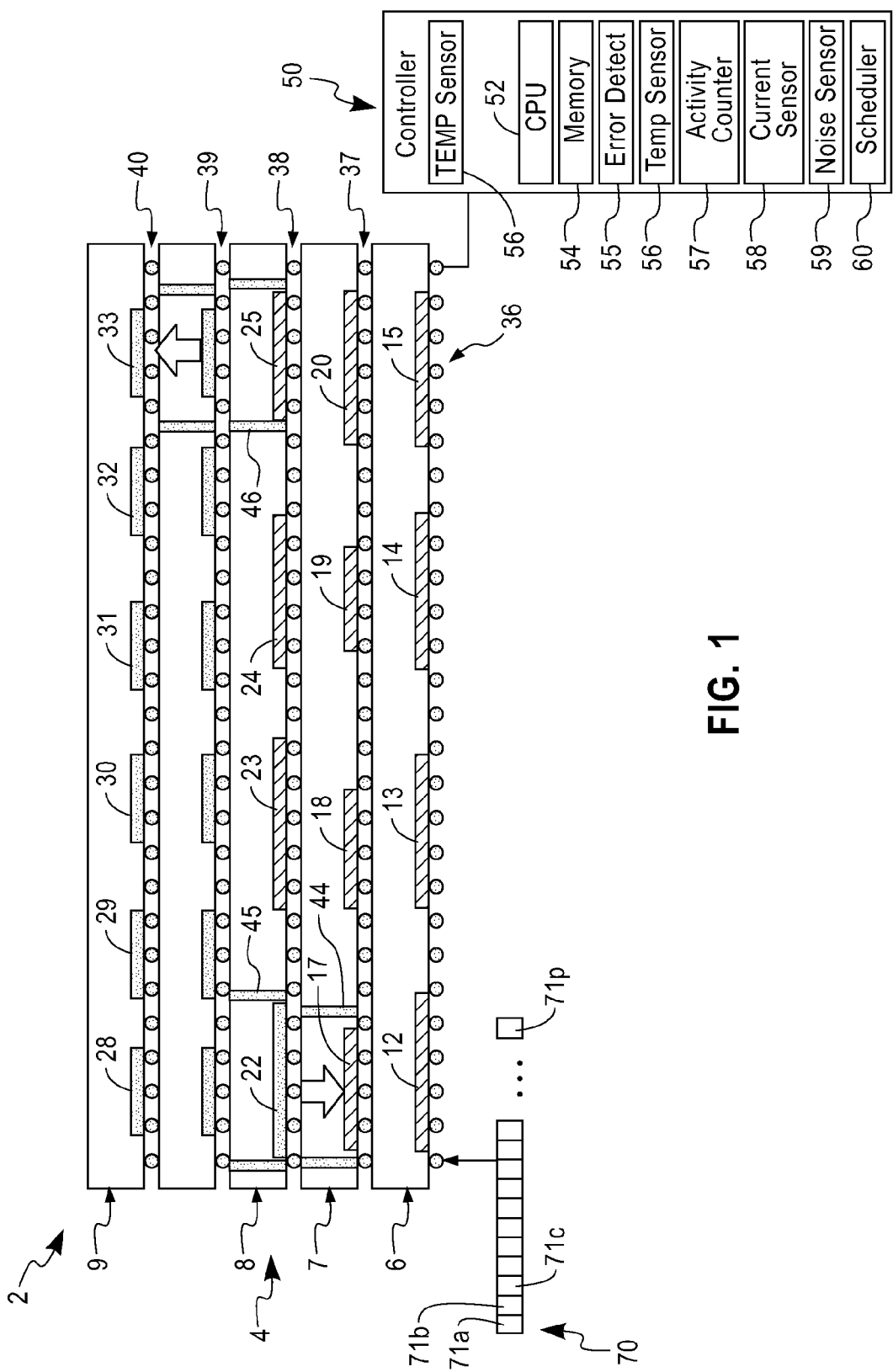
FIG. 1 is a schematic illustration of a three-dimensional (3D) logic circuit system including a three-dimensional (3D) stacked logic circuit and a controller for enhancing performance.

With reference to FIG. 1, a three-dimensional (3D) stacked microarchitecture in accordance with an exemplary embodiment is indicated generally at 2. Three-dimensional (3D) stacked microarchitecture 2 includes a logic circuit 4 having a plurality of layers 6-9. Each of the plurality of layers 6-9 includes a plurality of computational resources. In the exemplary embodiment, such resources can include digital logic such as cores, accelerators, caches, and routers, as well as analog logic such as transceivers. Of course other computational resources can also be employed without departing from the scope of the exemplary embodiment. In the example shown, layer 6 includes a plurality of cores 12-15; layer 7 includes a plurality of cores 17-20; layer 8 includes an accelerator 22 as well as a plurality of cores 23-25; and layer 9 includes a plurality of accelerators 28-33. Each of the plurality of layers 6-9 is also provided with a plurality of interconnect elements, shown in the form of a micro C4s, Cu—Cu interconnects or of other forms, indicated generally at 36-40 respectively. Logic circuit 4 is also provided with a plurality of interconnect members 44-46 that provide an interface between the various ones of layers 6-9. Interconnect members 44-46 can take on a variety of forms such as, for example, through silicone vias (TSVs). Of course it should be understood that other forms of communication paths could also be employed.

The spatial characteristics of 3D systems make it desirable to provide methods to control, among other things, temperature, current flow, and noise interaction across the layers in order to enhance, among other things, performance, power dissipation, and reliability of the system. In particular, simultaneous co-optimization of the above metrics is essential to optimize a 3D system in order to meet performance targets within a given power budget, and without requiring emergency measures to be taken to deal with temperature or noise overruns while ensuring product lifetime and mean time between failure constraints are satisfied.

In accordance with an exemplary embodiment, the term "hot spot" denotes the formation of a region of high temperature, power, current flow, current density, noise, susceptibility to soft errors (low reliability), resource contention, or other conditions that may result in undesirable effects. The terms "computational demand" or "computational requirement" denotes the performance, bandwidth, reliability, and other constraints that have to be satisfied to meet the operational requirements of a process.

In further accordance with the exemplary embodiment, microarchitecture 2 includes a controller 50 having a CPU 52, a memory 54, soft/hard error detector 55, a temperature sensor 56, an activity counter 57, a current sensor 58, a noise sensor 59, and a 3D Heterogeneous scheduler 60. Controller 50 is operationally linked to logic circuit 4 and, as will be detailed more fully below, is configured to control computational resource assignments and track information such as temperature, current and/or noise within each of the plurality of layers 6-9. In operation, a process queue 70 includes a plurality of processes or tasks 71a-71p that are pending for microarchitecture 2. Depending upon the computational demand, hot spots may be generated within one or more of the plurality of layers 6-9 when processing one or more tasks 71a-71p. Towards that end, controller 50 allocates tasks 71a-71p, and re-allocates existing processes, to various ones of the plurality of computational resources in order to mitigate the development of any hot spots within logic circuit 4. As will be detailed more fully below, controller 50 attempts to proactively avoid formation of hotspots and improve performance by estimating the combined impact of assigning tasks to different resources and locations in the 3D circuit 4.

Figure 2:
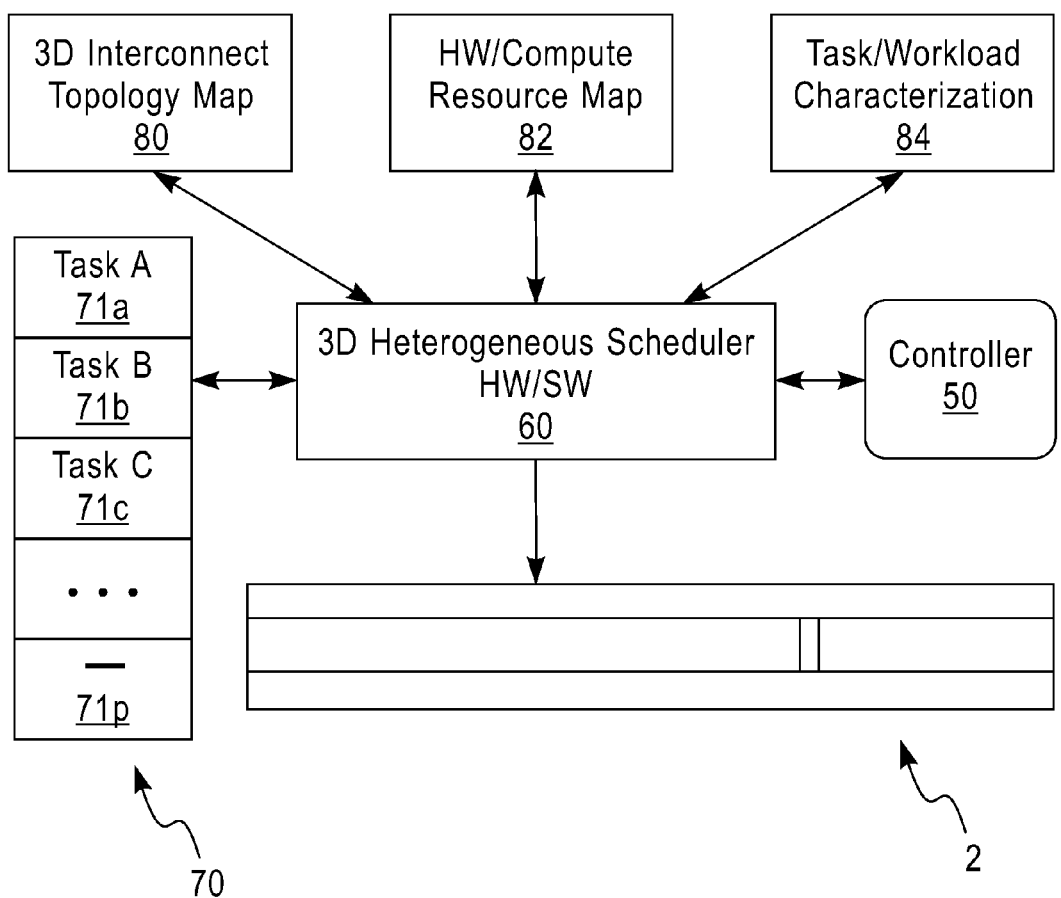
FIG. 2 is a block diagram illustrating process task assignment for the 3D stacked logic circuit of FIG. 1.
Figure 3:
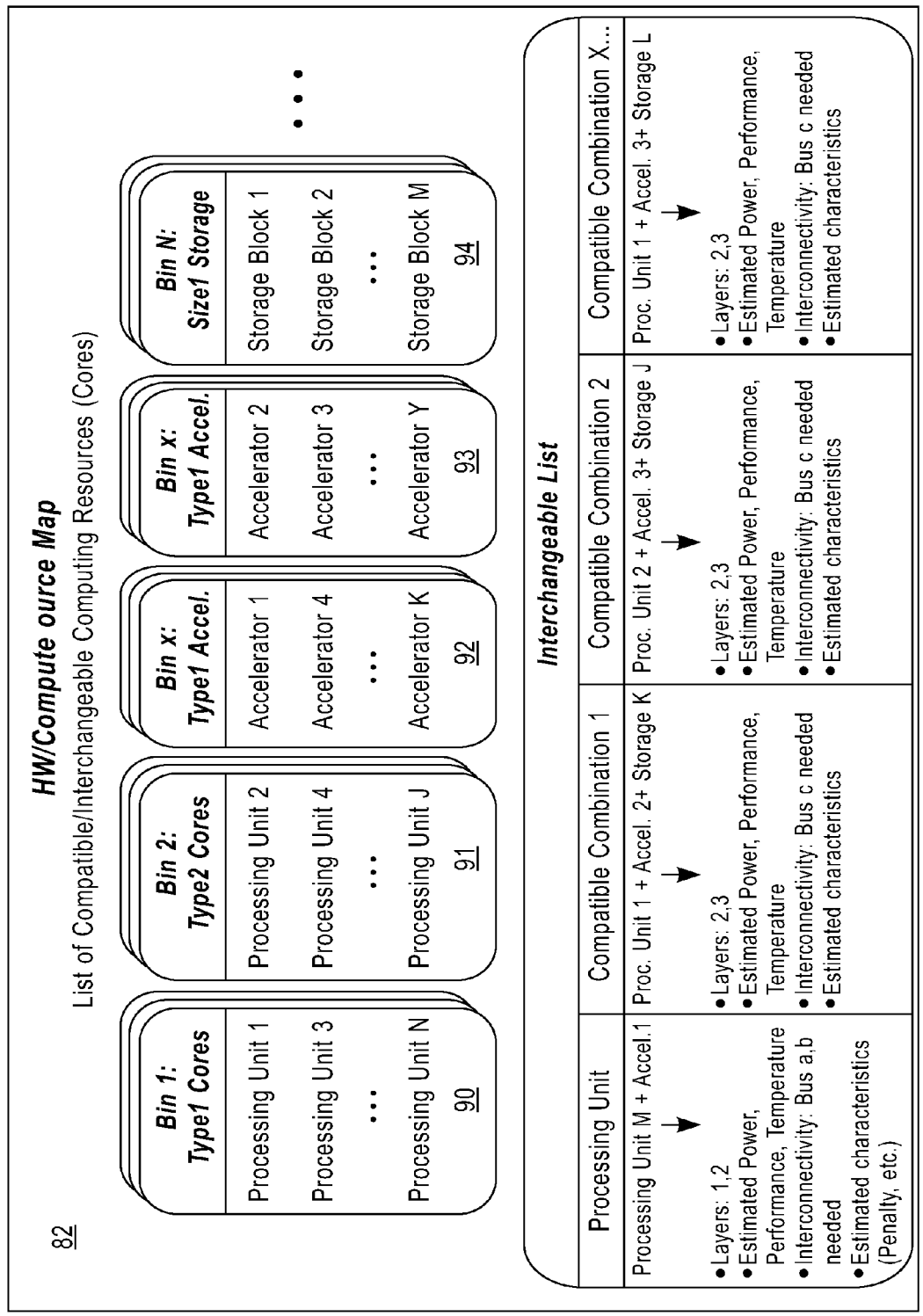
FIG. 3 is a block diagram illustrating an HW/Compute Resource Map in accordance with an exemplary embodiment.

An exemplary embodiment schedules a unit of work (task) on a specific processing location based on computational demand of a task, current hotspot/activity locations on each layer 6-9 and estimated hotspots that may be created as a consequence of task reassignment. More specifically, the exemplary embodiment selects which computational resources, and with which layer(s) 6-9 a task should communicate, based on physical location, current activity, hot spots etc. As will be detailed more fully below, before assigning a task to microarchitecture 2, scheduler 60 accesses a 3D interconnect topology map 80, a Hardware (HW)/Compute Resource map 82, a Task/Work Load Characterization map 84 and sensors 55-59 in controller 50 as shown in FIG. 2. 3D interconnect topology map 80 provides physical information regarding microarchitecture 2. For example, topology map 80 includes data relating to a distance to a particular bus, replica data, bandwidth data, nodes and connected storage data, congestion and criticality data, latency of access data, distance to replica data, cost of migration for each task, and temperature/power/performance data for each task. Scheduler 60 also accesses HW/Compute Resource map 82 which provides information regarding compatible/interchangeable computational resources capable of performing each task. That is, HW/Compute Resource map 82 determines which computational resource or combination(s) of computational resources are capable of performing a pending task. More specifically, HW/Compute Resource map 82 includes a plurality of bins, such as shown at 90-94 in FIG. 3, that include a listing of processing units, accelerators, storage blocks and the like capable of performing various computational tasks. HW/Compute Resource map 82 also includes an interchangeability list 100 that identifies different compatible groups of resources that are capable of performing a pending task.

Finally, scheduler 60 accesses Task/Work Load Characterization map 84 for information regarding, for example, a desired target performance, required acceleration, processing time, cache/memory requests, task history and the like for each task. Map 84 can also include other information such as noise, current, temperature, and reliability requirements. Based on the data provided by maps 80, 82, and 84, and sensors 55-59 in controller 50, scheduler 60 proactively determines how to allocate computational resources on microarchitecture 2 in such a manner to avoid creating unnecessary "hot spots". By predicting a probability of a "hot spot" before assigning a task, the exemplary embodiment enhances performance while reducing the formation of temperature, current and/or noise hotspots to enhance overall system performance. The exemplary embodiment enhances an on-chip computational profile not only by tracking temperature, current and/or noise of individual computational resources but also the computational demand in each layer 6-9; interconnectivity and congestion between computational resources and layers, costs associated with latency resulting from process migration; and sharing of data among computational resources for which a hot spot profile is enhanced.

In further accordance with the exemplary embodiment, process task assignment is implemented either in hardware (HW) or in software (SW) or combinations thereof. Static tables representing, for example, topology, interconnectivity, variations in chip characteristics due to manufacturing variability, and dynamic tables representing, for example, current temperature/power/current/noise of individual resources or stack-columns such as vertical columns formed by resources 12, 17, 22, and 28 across layers 6-9 can be represented in both HW and SW and be used by the scheduling algorithm to determine the best solution (placement and migration of tasks) based on the currently demanded criteria such as performance, temperature, and/or reliability requirements.

Figure 4:
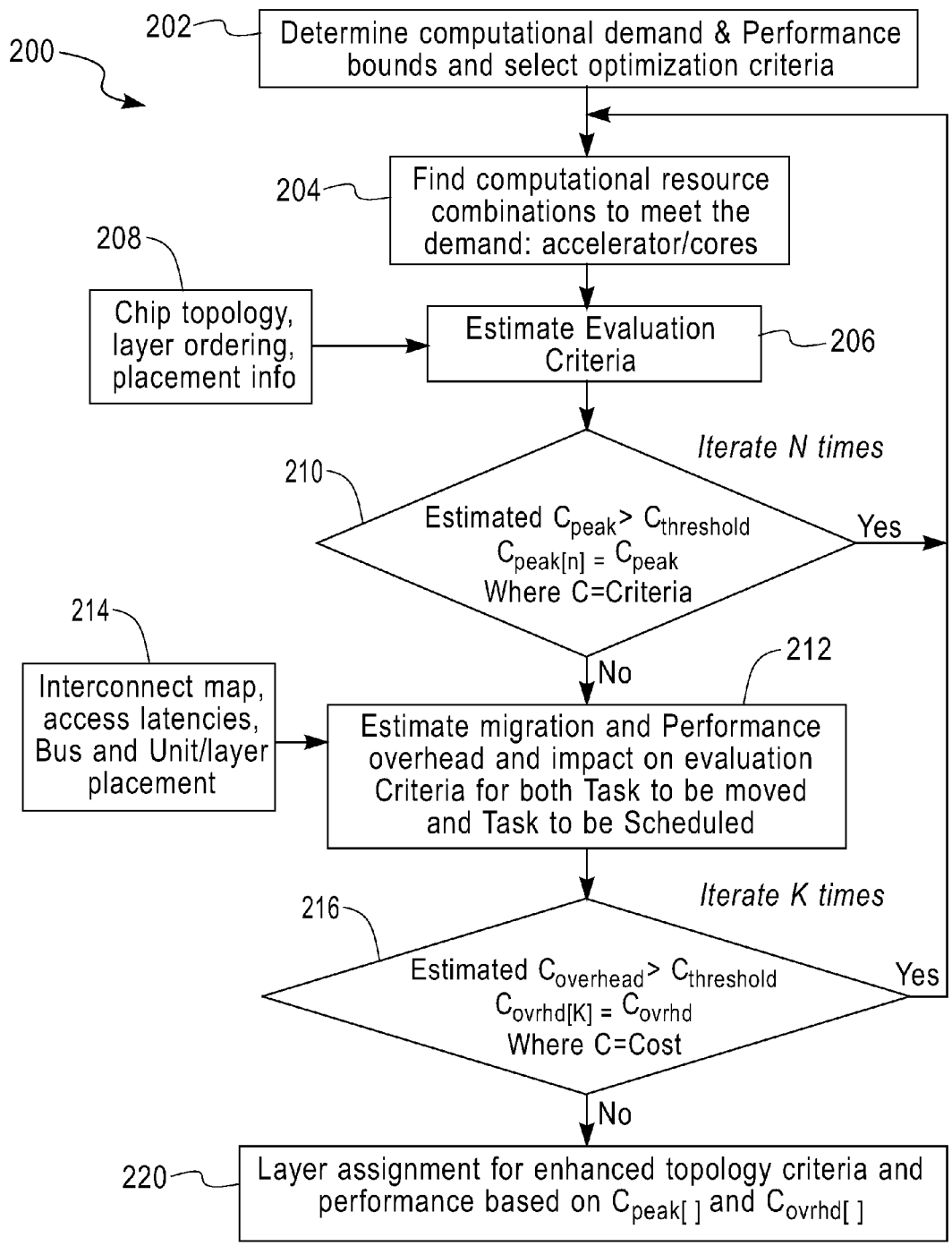
FIG. 4 is a flow chart illustrating a method of enhancing performance of a three-dimensional stacked logic circuit.

Reference will now be made to FIG. 4 in describing a method 200 of enhancing performance of microarchitecture 2. In accordance with the exemplary embodiment, for each task 71a-71p, an optimization criteria along with computational requirements and performance bounds is determined in block. For example, for a particular task, is it desirable to optimize temperature, current usage, memory usage and the like. Once the computational demands and performance bounds are determined, computational resource combinations capable of meeting the computational demands are identified as indicated in block 204. That is, select ones of the computational resources, e.g. combinations of accelerators, cores, and caches, that posses the performance characteristics to perform the particular process are identified. It should be understood that the algorithms presented herein are intended to concurrently optimize assignments either for all, or a selected subset of, tasks in task queue 70, and tasks already assigned to circuit 4 simultaneously to arrive at a globally optimal solution. Thus, 3D Heterogeneous Scheduler 60 may simultaneously consider one or more tasks in the task queue 70 when computing a task assignment.

After identifying the particular computational resource or resource combination(s) in block 204, an estimation is made of, for example, temperature, current and reliability requirements and/or noise generation to establish an evaluation criteria for each of the particular computational resources in the combination as indicated in block 206. That is, the optimization criteria, such as performance, power, topology, temperature, reliability, current, and/or noise of the computational resources is evaluated for each resource or combination or resources capable of performing the task. The evaluation criteria defines an ability of the computational resource to meet the optimization criteria. More specifically, for example, if a task is known to be hot, e.g., computationally intensive, it is desirable for the process to be performed adjacent a region on one of layers 6-9 that is currently processing non-computationally intensive tasks requiring fewer computational resources. If, on the other hand, the process is known to be cold or not computationally intensive, it is desirable for the process to be performed adjacent a "hot" or computationally intensive region on one of layers 6-9.

In determining computational capabilities within each layer 6-9, chip topology, layer ordering, soft-error hardened resources, and min/max frequency differences due to manufacturing variance, reduced capacity or capability due to defects, and computational resource placement and the like are taken into account as indicated at block 208. At this point, a determination is made if the estimated computational demand will cause temperature, current, or noise and the like to exceed the evaluation criteria threshold for each computational resource combination identified in block 210. If the estimated peak of, for example a weighted formulae based on temperature and current density, is greater than the maximum allowed for each computational resource combination, the process returns to block 204 to identify additional computation resource combinations that will meet the computational demand.

If no combination of the identified computational resources will result in a peak that is less than the threshold, a determination is made whether existing processes, that is processes that are already being processed by logic circuit 4, can be migrated to other areas of three-dimensional logic circuit 4 as indicated in block 212. When determining whether existing tasks can be moved or migrated, a performance factor or a factor that describes any degradation in system performance and impact on the evaluation criteria for the task to be migrated as well as the task to be assigned is taken into account. In this manner the existing task is only migrated if migration would improve the evaluation criteria for the task to be assigned. Performance overhead is determined based on, in part, interconnect mapping of three-dimensional logic circuit 4, access latencies, as well as bus and unit/layer placement as indicated in block 214. At this point, a determination is made whether the cost of moving existing processes is less than a threshold cost as indicated in block 216. It should be understood that the term cost does not relate to monetary cost of moving processes but rather to a performance cost, e.g., a decrease in system performance resulting from the move. In any event, if the estimated overhead cost is greater than the threshold cost, additional computational resource combinations are identified in block 204. If however, the overhead is less than the threshold cost, the existing processes are assigned to computational resources in order to achieve an enhanced topology performance as indicated in block 220. Process assignment is driven by co-optimization of temperature/current/noise and the like, migration and performance aware task matching. Processes are assigned to computational resources so as to reduce temperature/current/noise and the like and migration overhead while simultaneously enhancing performance.

That is, method 200 proactively ensures that hot spots resulting from performing computational intensive processes on adjacent computational resources are minimized. It should be understood that adjacent computational resources include resources located on the same layer or on adjacent layers. In addition, it should be understood that controller 50 monitors temperature/current/noise/errors within logic circuit 4 by use of soft/hard error detector 55, temperature sensor 56, current sensor 58, and noise sensor 59. In the event that activity counters, temperature sensors, current sensors, and/or noise sensors warn of a hotspot in a layer that overlaps a hotspot in an adjacent layer, one or the other of the process are reassigned to a computational resource that does not have an overlapping hotspot and "cooler" processes are reassigned to the area having the hotspot. If no "cold spots" exist, voltage/frequency for the computational resource exhibiting the hotspot is scaled back, the computational resource is shut down (power gating) or the computational resources that can be used by a process are restricted or otherwise changed, or the number of running tasks is reduced. When determining process scheduling, relocation (migration) and shut down, the exemplary embodiment employs one or more of soft/hard error detectors, temperature sensors, activity counters, current sensors, noise sensors, known characteristics of unit work, dependencies on resources on other layers, and physical location to make a decision of which action should be taken.

At this point, it should be understood that the present invention provides a system and method for proactively ensuring that hot spots within three-dimensional logic circuits remain within operational ranges without sacrificing system performance. That is, the system and method of the present invention identifies potential hot spots created by the combined activity of various processes with potentially varying computational characteristics, identifies combinations of computational resources for performing the processes within the three-dimensional logic circuit and, assigns tasks in a manner to proactively avoid creating the potential "hot spots" thereby resulting in improved performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of enhancing performance of a three-dimensional microarchitecture, the method comprising:
    determining a computational demand for performing a task;

selecting an optimization criteria for the task;
identifying at least one of a plurality of computational resources of the microarchitecture configured to meet the computational demand for performing the task;
calculating an evaluation criteria for the at least one computational resource based on the computational demand for performing the task, the evaluation criteria defining an ability of the computational resource to meet the optimization criteria; and
assigning the task to one of the plurality of computational resources based on the evaluation criteria of the computational resource in order to proactively avoid creating a hot spot on the three-dimensional microarchitecture, the hot spot defining at least two of a region of high temperature, high power, high current flow, high current density, high noise, and a susceptibility to soft errors.

2. The method of claim 1, wherein identifying at least one computational resource includes identifying a combination of computational resources to meet the computational demand for performing the task.

3. The method of claim 2, wherein assigning the task to the computational resource includes assigning the process to select ones of the combination of computational resources based on the computational demand.

4. The method of claim 2, wherein identifying at least one combination of computational resources includes identifying multiple alternative combinations of computational resources for performing the task.

5. The method of claim 4, further comprising:
calculating an estimated evaluation criteria for each computational resources in each of the multiple alternative combinations of computational resources based on the computational demand for performing the task; and
assigning the task to one of the multiple alternative combinations of computational resources in order to avoid excessive hot spots within the three-dimensional microarchitecture.

6. The method of claim 1, wherein assigning the task to the computational resource includes migrating at least one existing task to at least one other computational resource in order to control performance hot spots in the three-dimensional microarchitecture.

7. The method of claim 6, further comprising: determining a performance factor associated with migrating the existing task to the at least one other computational resource.

8. The method of claim 6, wherein migrating the at least one existing task includes migrating a plurality of existing task to other computational resources in order to control computational demand within the three-dimensional microarchitecture.

9. The method of claim 8, further comprising: determining a performance factor associated with migrating each of the plurality of existing tasks.

10. The method of claim 6, wherein migrating the at least one existing task to the at least one other computational resource includes passing the at least one task from a computational resource located on one layer of the three-dimensional microarchitecture to a computational resource located on another layer of the three-dimensional microarchitecture.

11. The method of claim 10, further comprising: passing the at least one existing task from the computational resource located on one layer of the three-dimensional microarchitecture along one of a through silicon via and a three-dimensional bus to the computational resource located on the another layer of the three-dimensional microarchitecture.

12. A three-dimensional microarchitecture comprising:
a first layer including a first plurality of computational resources;
a second layer including a second plurality of computational resources; and
a controller operationally linked to each of the first and second pluralities of computational resources to selectively assign a task to select ones of the first and second pluralities of computational resources based on an optimization criteria for performing the task in order to proactively avoid a hot spot condition on either of the first and second layers, the hot spot defining at least two of a region of high temperature, high power, high current flow, high current density, high noise, and a susceptibility to soft errors.

13. The three-dimensional microarchitecture according to claim 12, further comprising: a plurality of interconnect members extending between the first and second layers, the controller migrating existing tasks from select ones of the first and second pluralities of computational resources to other select ones of the first and second pluralities of computational resources via the interconnect members in order to avoid a hot spot condition on either of the first and second layers upon receipt of the process.

14. The three-dimensional microarchitecture according to claim 12, wherein the controller includes a 3D interconnect topology map that provides physical information regarding the three-dimensional microarchitecture.

15. The three-dimensional microarchitecture according to claim 12, wherein the controller includes a Hardware/Compute resources Map that indicated multiple alternative combinations of computational resources for performing the task.

16. The three-dimensional microarchitecture according to claim 12, wherein the controller includes a task/workload characterization map that provides a desired target performance for the task.

17. The three-dimensional microarchitecture according to claim 16, wherein the desired target performance includes at least one of a desired power requirement, a desired performance requirement, a desired temperature requirement, a desired acceleration, a desired processing time, a desired number of cache/memory requests, and a task history for each task.

* * * * *